United States Patent [19]
Hagy et al.

[11] 3,894,437
[45] July 15, 1975

[54] METHOD OF AND MEANS FOR DYNAMIC GAIT ANALYSIS

[76] Inventors: John L. Hagy, 1462 Gordon St. Apt. No. 2, Redwood City, Calif. 94061; John R. Hawthorn, P.O. Box 62, Crane, Ind. 47522; Cecil W. Keller, 1751 Santa Cruz Ave., Santa Clara, Calif. 95051; Leonard M. Musil, 7567 Normandy Way, San Jose, Calif. 95129

[22] Filed: Jan. 10, 1974

[21] Appl. No.: 432,146

[52] U.S. Cl. ............... 73/432 R; 73/172; 73/379; 128/2 S
[51] Int. Cl. ............................................. A61b 5/10
[58] Field of Search ........... 73/172, 65, 379, 432 R; 128/2 S, 2 N; 340/279

[56] References Cited
UNITED STATES PATENTS

| | | | |
|---|---|---|---|
| 2,290,387 | 7/1942 | Schwartz | 73/172 |
| 2,325,490 | 7/1943 | Elftman | 128/2 S |
| 3,340,726 | 9/1967 | Armstrong et al. | 73/133 |
| 3,712,294 | 1/1973 | Muller | 73/65 |
| 3,826,145 | 7/1974 | McFarland | 128/2 S |
| 3,850,034 | 11/1974 | Tsuchiya et al. | 128/2 S |

FOREIGN PATENTS OR APPLICATIONS

| | | | |
|---|---|---|---|
| 1,918,521 | 10/1969 | Germany | 128/2 S |

*Primary Examiner*—Jerry W. Myracle
*Assistant Examiner*—Marcus S. Rasco
*Attorney, Agent, or Firm*—Phillips, Moore, Weissenberger Lempio & Strabala

[57] ABSTRACT

A method of dynamically analyzing gait, particularly of a human being, is disclosed. The use of such method in diagnosing physical infirmities is described. A means for practicing such method, including a force plate coupled through appropriate piezoelectric quartz crystals to appropriate electronic processing equipment is disclosed and a specific embodiment of such means is described.

22 Claims, 11 Drawing Figures

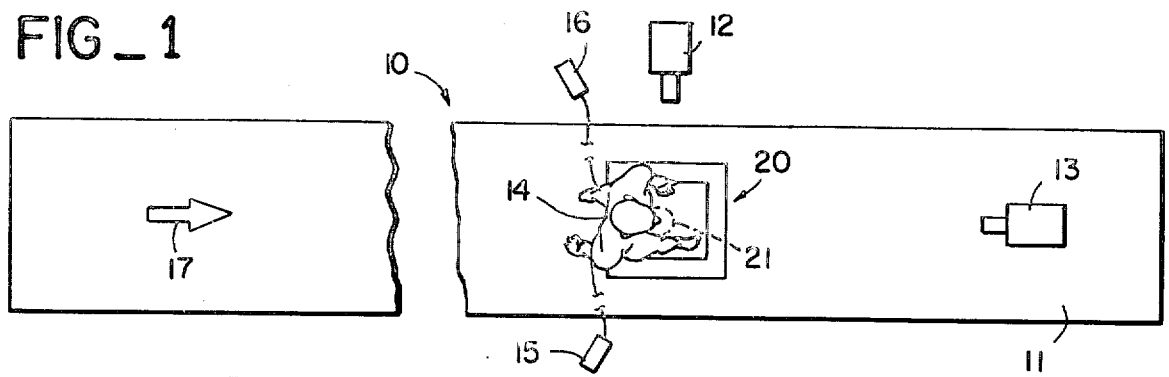
FIG_1
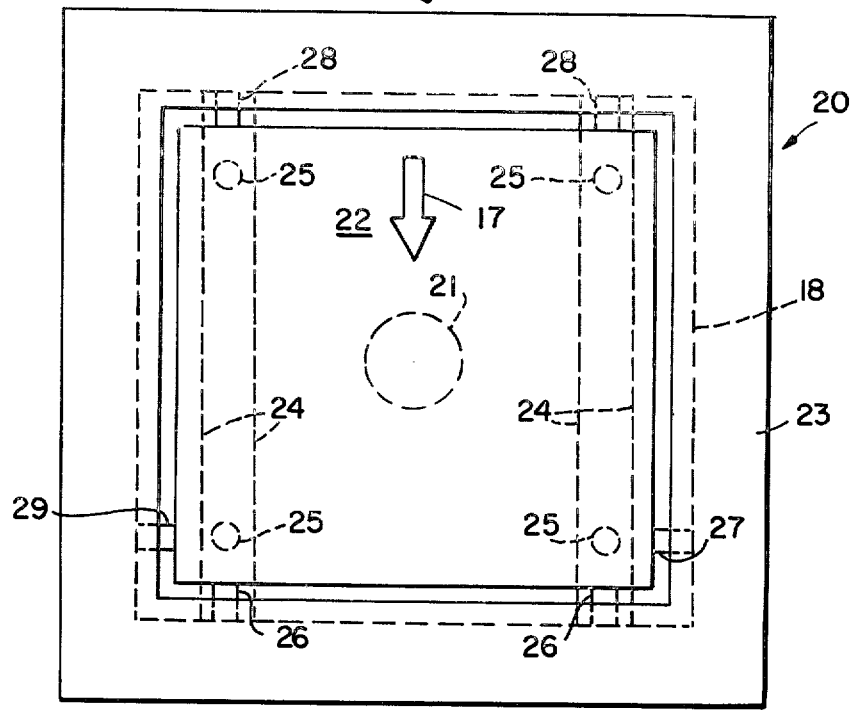
FIG_2
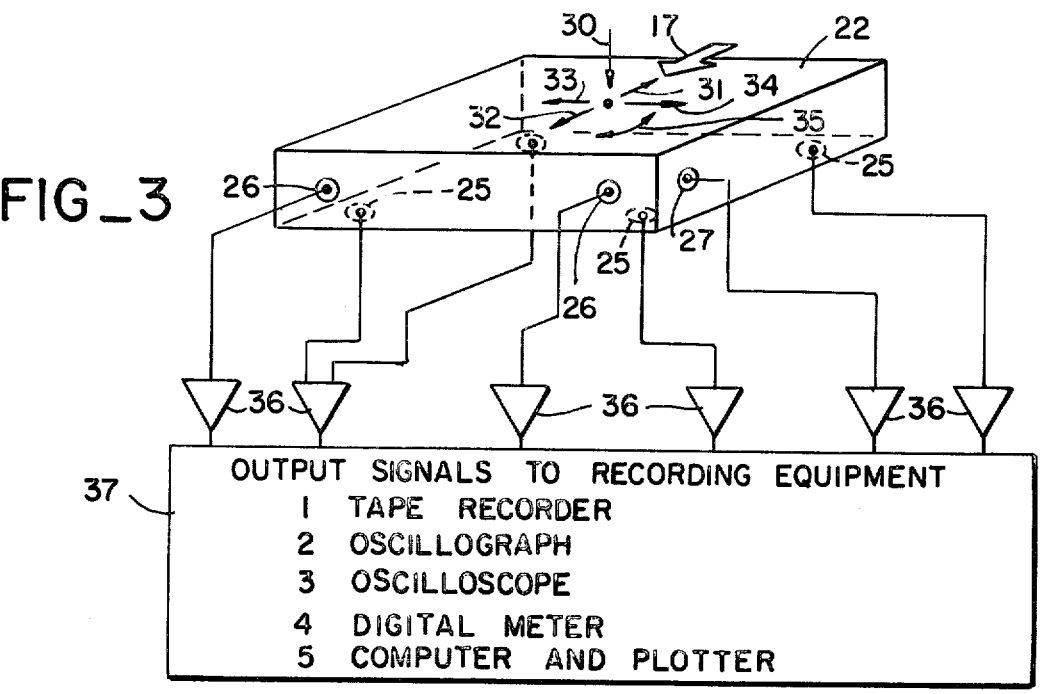
FIG_3

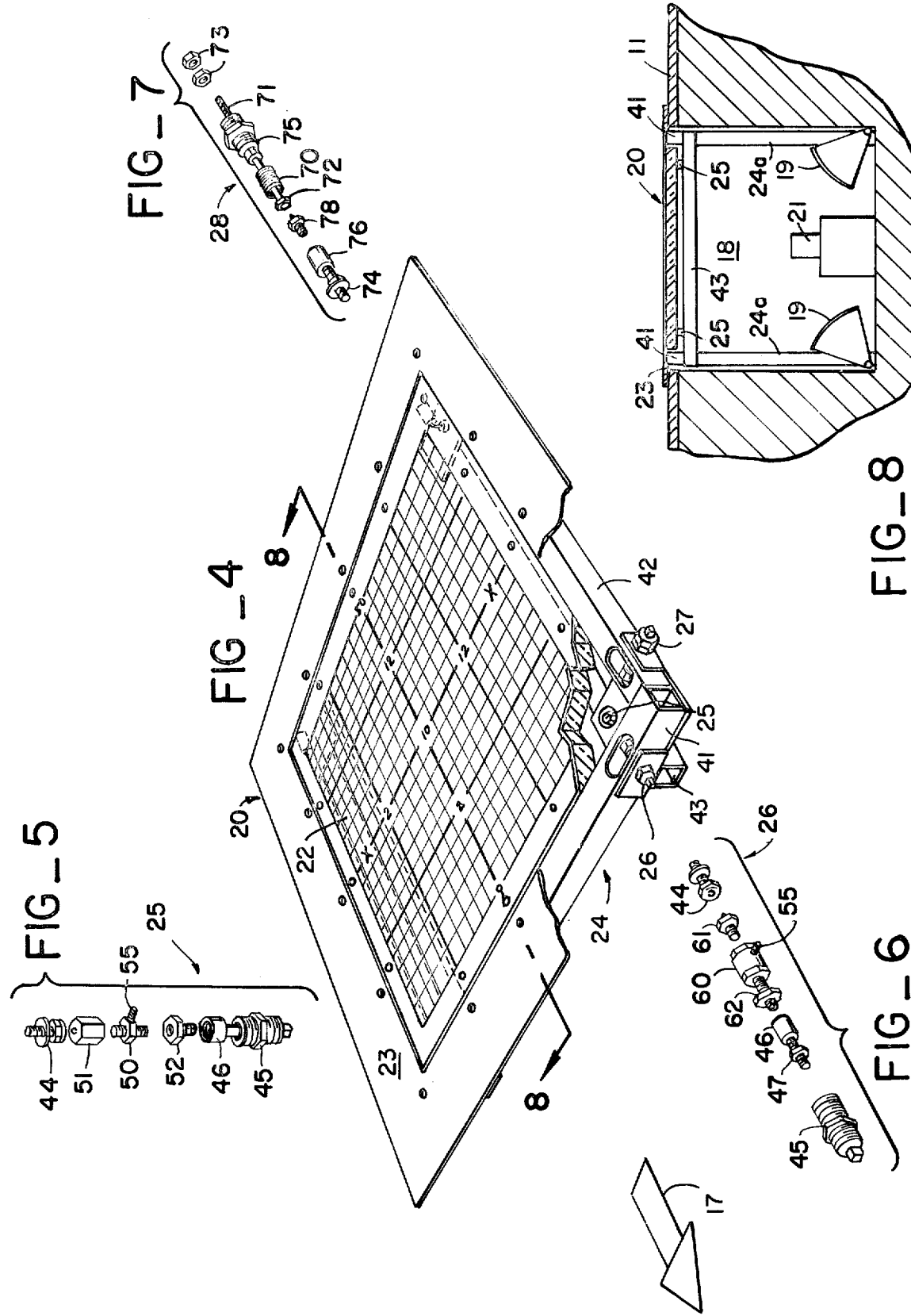

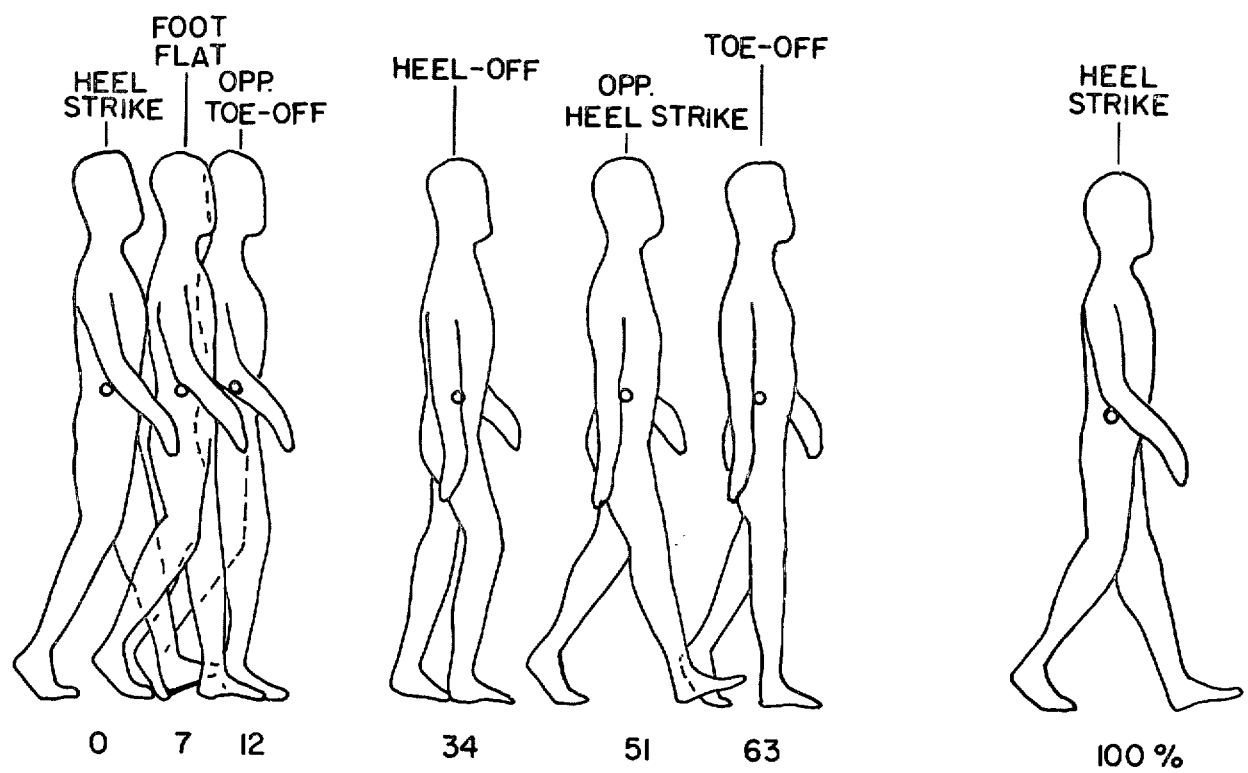
FIG_9
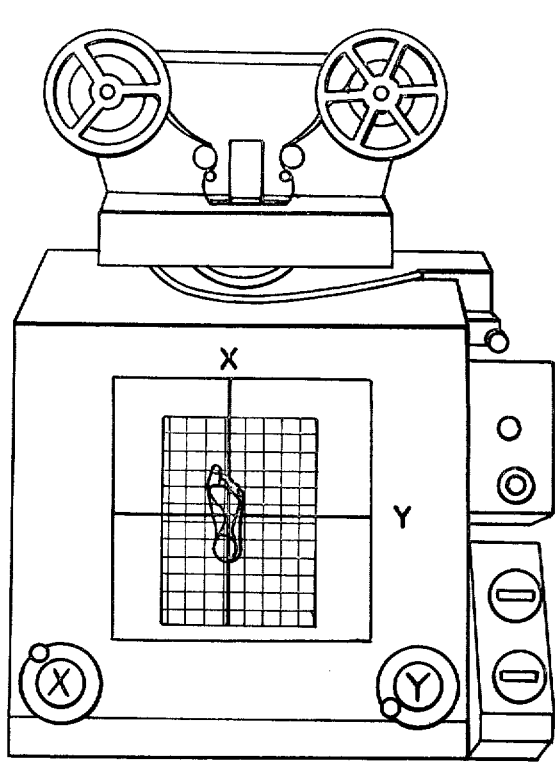
FIG_10
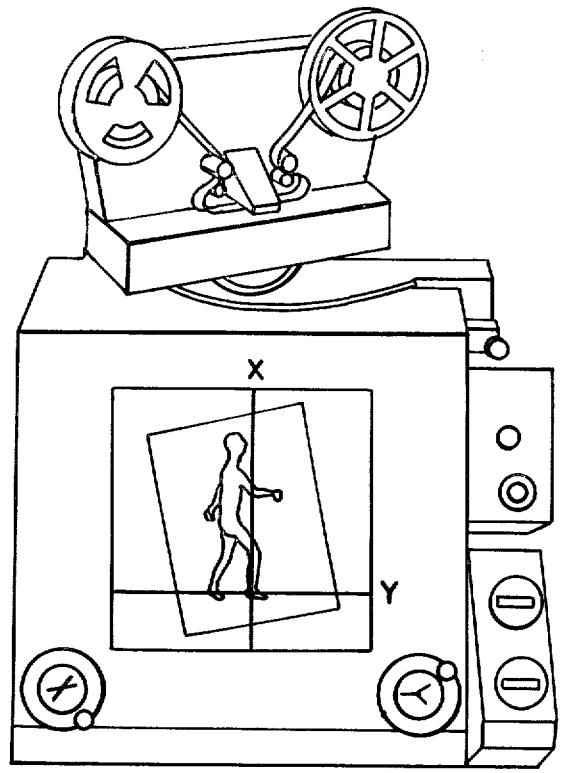
FIG_11

METHOD OF AND MEANS FOR DYNAMIC GAIT ANALYSIS

BACKGROUND OF THE INVENTION

1. Field of the Invention

This invention relates to gait analysis, particularly of human beings, and more specifically to a method of dynamically analyzing the gait of human beings for diagnostic or identification purposes and to means for providing dynamic information in a form suitable for processing or recording for further analysis.

2. Reference to the Prior Art

It has been proposed heretofore to measure the vertical, longitudinal and lateral force components imposed on a plate by the foot of a walking subject in an attempt to determine normal and abnormal aspects of the gait of such subject. According to the prior art, such measurements were made by means capable of sensing the total values of such forces at a particular instant of time and it was possible to compute the resultants of such forces and the torque produced by such forces at such instant of time. However, with the means previously available, significant errors in measured force values were encountered, particularly where the force values varied rapidly over very small increments of time. The gait of a subject is in fact a continuous process and abnormalities in gait may occur gradually or rapidly throughout a step of such gait or at a plurality of separate points during a step of such gait. Thus, according to the prior art, sensing the forces accurately enough and at precisely the right instant of time to detect an abnormality was largely a matter of chance and detecting abnormalities which were rapid in their execution was virtually impossible. Attempting to repeatedly sense the forces at different intervals of time corresponding to different portions of the gait executed by the subject was laborious and unreliable even where electrical devices, such as strain-gages, were used to produce electrical signals suitable for recording or electronic processing.

SUMMARY OF THE INVENTION

According to the method of this invention the varying vertical, longitudinal and lateral forces imposed by a foot of a walking subject during a given interval of time, preferably corresponding to a step in the gait of the subject, are converted to correspondingly varying electrical signals. The varying electrical signals are recorded with respect to time and the values thereof at successive instants of the given interval of time are compared to each other. The method includes the additional steps of photographing the walking subject in the plane of the walk path at successive instants of the interval of time and subsequently correlating the photographs with the recorded electrical signals with respect to time. The method may also include the step of obtaining and recording data with respect to the muscle activity of the lower extremities of the walking subject during the given interval of time by electromyography and correlating such data with the recorded electrical signals with respect to time. Finally, the recorded electrical signals and the photographs taken in the plane of the walkpath may be processed with respect to each other, in time, to provide information as to the varying moments of such forces throughout the interval of time and as to the varying torque produced by such forces throughout the interval of time.

The apparatus of this invention includes a rigid force plate having opposed major surfaces of larger area than the contact area of the foot of the walking subject and a peripheral edge normal to the major surfaces. The plate is mounted with one of its major surfaces forming part of the path of the walking subject by means including a plurality of piezoelectric load cells and a plurality of compression springs in operative contact with the plate. A first one of the load cells and a first one of the compression springs contact the edge of the plate at points on opposite sides of the plate lying on a first line. A second load cell and a second compression spring contact the edge of the plate at points on opposite sides of the plate lying on a second line transverse to the first line and a third load cell contacts the other major surface of the plate. Means are included for recording the electrical output of the load cells with respect to time. According to the preferred embodiment of the invention, the plate is transparent and mounted over a pit in the path. A camera is located in such pit to photograph the foot of the subject in contact with the plate. In a preferred embodiment, there are three load cells in contact with spaced points on the lower major surface of the plate. Also in a preferred embodiment, the edge of the plate has a rectilinear portion perpendicular to the longitudinal axis of the path and two load cells are in contact with spaced points on such rectilinear edge portion. Various means may be included for recording and processing the varying electrical signals produced by the load cells and electromyography apparatus may also be included as well as additional photographic equipment.

BRIEF DESCRIPTION OF THE DRAWING

FIG. 1 is a top plan view of a walkpath including a force plate assembly according to this invention and includes a schematic representation of cameras in positions which may be used in the method of this invention.

FIG. 2 is an enlarged plan view of the force plate assembly shown in FIG. 1 with additional structural elements as well as load cell assemblies, compression spring assemblies and a camera indicated by dotted lines.

FIG. 3 is a simplified perspective view of the force plate of FIGS. 1 and 2 with the forces indicated schematically and the load cell assemblies and recording means indicated in block diagram form.

FIG. 4 is a perspective view of the force plate and mounting frame assembly according to one embodiment of this invention, partially broken away to show certain of the load cell assemblies.

FIG. 5 is an exploded view of a vertical load cell assembly of FIG. 4.

FIG. 6 is an exploded view of a longitudinal load cell assembly of FIG. 4.

FIG. 7 is an exploded view of a compression spring assembly of FIG. 4.

FIG. 8 is a cross sectional view of a force plate assembly mounted in position over a pit in the walkway according to this invention with the location of a camera and lights in the pit indicated schematically.

FIG. 9 is a schematic representation of the gait of a walking subject showing the subject at various points in such gait.

FIG. 10 is a front view of a device for analyzing motion pictures useful in the method of this invention and illustrating the analysis of the photographs of the foot of the subject in contact with the force plate in accordance with this invention.

FIG. 11 is a view similar to FIG. 10 but illustrating the use of the device of FIG. 10 to analyze motion pictures taken in a vertical plane.

DESCRIPTION OF THE PREFERRED EMBODIMENTS

Referring to FIG. 1 the general layout of a dynamic gait analysis laboratory 10 according to the teaching of this invention is shown looking down on the plane of the walkpath 11 thereof. According to this embodiment of the invention, the walkpath 11 may comprise a hard rubber mat approximately 30 feet in length and 4 feet in width. High-speed motion picture cameras 12 (only one which is shown) may be located on either side of the walkpath 11 approximately 20 feet from the centerline thereof. A further high-speed motion picture camera 13 may be located directly on the centerline of the walkpath 11 and approximately 50 feet along the longitudinal axis of the walkpath from the point of intersection of the center of the field of view of the side cameras 12 therewith. The center of the field of view for the side 12 and end 13 cameras preferably intersect at a point approximately 18 inches above the plane of the walkpath 11. Electronic clocks with digital readouts (not shown) may be positioned near the edge of the field of view of each of these cameras 12, 13 to provide a convenient real-time reference between views. The cameras 12 and 13 preferably each have two lenses facing in opposite directions and are capable of obtaining simultaneous superimposed images of the walking subject with a real-time display of electronic data from an oscilloscope (not shown) mounted behind each camera. It will be understood that in FIG. 1 the spacing of the cameras 12 and 13 with respect to each other and to the walkway 11 are considerably foreshortened for ease of representation.

As represented schematically in FIG. 1, the walking subject 14 may be fitted with one or more sensors for detecting electrical activity in the muscles of the lower extremities. Such sensors are coupled to appropriate electronic devices represented at 15 and 16 for providing electromyographic data for recording and analysis in conjunction with the motion pictures. The use of electromyographic data in conjunction with motion pictures of a walking subject to analyze certain elements of the gait of a walking subject have been described in the *Journal of Bone and Joint Surgery*, Vol. 48-A, No. 1, pages 66–71, January 1966 and in the *Journal of Bone and Joint Surgery*, Vol. 54-A, No. 4, pages 787–797, June 1972. In FIGS. 1–4 the direction in which the subject walks along the walkpath 11 is indicated by the arrow 17.

According to the teaching of this invention, a force plate assembly indicated generally at 20 is mounted flush with the surface of the walkpath 11 and with its center lying at the point along the longitudinal axis of the walkpath where the field of view of the cameras 12 and 13 intersect. As best shown in FIG. 8 the force plate assembly 20 may be mounted over a pit 18 under the walkpath 11. Appropriate lamps 19 may be mounted in the pit for illuminating the force plate assembly 20 from the underside and as will be described more fully hereinafter the force plate 22 of the assembly 20 may be transparent to enable the foot of the walking subject to be photographed in contact with the force plate 22 in the plane of the walkpath 11 by a camera 21 located in the pit 18.

Referring to FIG. 2, a top view of a force plate assembly 20 according to a preferred embodiment of this invention is shown with the arrow 17 indicating the direction of motion of the walking subject with respect to such assembly 20. As shown in FIG. 2, it will be seen that the force plate itself 22, according to this embodiment of the invention, is generally square. The upper major surface of the force plate 22 lies in the plane of the walkpath 11 and has an area substantially larger than the contact area of a foot of the walking subject. The force plate 22 is of sufficient thickness to be rigid when subjected to the full weight of the walking subject on one foot and may be opaque, translucent or transparent. According to this embodiment of the invention, the force plate 22 is transparent to enable motion pictures to be taken of the foot of the walking subject in contact with the force plate by the camera 21 located beneath the force plate 22 in the pit 18. The force plate 22 is mounted over the pit 18 by means of a flange 23 dimensioned to overlap the edge of the pit 18 and by a support structure, indicated generally in FIG. 2 by reference numeral 24, mounted on four legs 24a underlying the support structure 24 in the pit 18.

The force plate 22 is vertically supported on the support means 24 by means of a plurality of load cell assemblies indicated in FIG. 2 by the reference numeral 25. According to the embodiment shown in FIG. 2 there are 4 such vertical load cell assemblies 25 located at the four corners of the force plate 22 in order to provide maximum vertical stability when the force plate is contacted by a foot of the walking subject. Obviously, additional vertical load cell assemblies could be used and it would be possible to support the force plate 22 on but three vertical load cell assemblies 25 although it would be more difficult to locate the three load cell assemblies with respect to the force plate in order to provide the desired vertical stability.

According to this embodiment of the invention, a pair of longitudinal load cell assemblies 26 are mounted on the support means 24 in contact with the forward edge of the force plate 22 at opposite ends thereof and a transverse load cell assembly 27 is mounted on the support means 24 in contact with a side edge of the force plate 22 adjacent the forward end thereof. A pair of compression spring assemblies 28 are mounted on the support means 24 in contact with the rearward edge of the force plate 22 opposite the longitudinal load cell assemblies 26 and a further compression spring assembly 29 is mounted on the support means 24 in contact with the other side edge of the force plate 22 opposite the transverse load cell assembly 27.

According to this invention, the load cells of assemblies 25, 26 and 27 are all of the piezoelectric crystal type. As is well known, a piezoelectric crystal will produce an electrical output when subjected to changing compression or tension forces. However, the electrical output of a piezoelectric crystal will cease when the force applied thereto ceases to change. Thus, it will be seen that the compression spring assemblies 28 and 29 are adapted to subject the load cell assemblies 26 and 27, respectively, to a certain fixed force when the plate is not in use. Thus, the load cell assemblies 26 and 27 are biased to produce an output if any change in force occurs resulting in either an increase or a decrease from such fixed force. Similarly, the weight of the force plate 22 will exert a certain biasing force on the vertical load cell assemblies 25. However, it will be understood that when the foot of the walking subject contacts the upper surface of the force plate 22 all of the load cell assemblies 25 will be subjected to vertical force so long as the foot of the walking subject remains in contact with the force plate 22. The distribution of such force among the various load cell aseemblies 25 will, of course, vary depending on the location of the contact of the foot of the subject on the force plate 22 and the way in which the weight of the walking subject is shifted on the foot in walking.

Referring to FIG. 3, a schematic representation of the force plate 22 and load cell assemblies 25, 26, and 27 together with a block representation of the electronic equipment that may be used therewith is shown. Again, the arrow 17 represents the direction of motion of the walking subject with respect to the force plate 22.

The arrow 30 represents the vertical force exerted on the force plate by the foot of the walking subject in contact therewith. It will be understood that such vertical force 30 will actually be spread over a substantial contact area between the foot and the force plate 22 and it will also be understood that such vertical force 30 will result in the application of varying amounts of vertical force to the load cell assemblies 25 depending on the location of the contact area of the foot with the upper surface of the force plate 22. Changes in the distribution of such vertical force 30 over the contact area of the foot may be calculated by comparing the changing vertical forces applied to the individual vertical load cell assemblies 25 with respect to each other. It is also possible to compute the changing moments of such vertical force 30 from the data supplied by the load cells of assemblies 25. However, according to the teaching of this invention, the motion pictures of the foot in contact with the plate 22 taken by the camera 21 augment the data provided by the load cells of assemblies 25 insofar as they permit a comparison between the calculated center of pressure and the actual footprint on the surface of the plate 22. According to the embodiment of this invention shown in FIG. 3, the outputs of the two right-hand load cell assemblies 25 are combined for comparison with the outputs of each of the two left-hand vertical load cell assemblies 25 and with the motion pictures taken by the camera 21.

The outputs of the load cell assemblies 26 provide information with respect to the forces exerted on the force plate 22 by the foot of the walking subject longitudinally of the walkpath, both in the forward direction as represented by the arrow 32 and in the rearward direction as indicated by the arrow 31. Similarly, the output of the transverse load cell assembly 27 provides information with respect to the forces exerted by the foot of the walking subject on the force plate 22 in directions transverse to the walkpath. Such transverse forces are represented by the arrows 33 and 34, one of which may be referred to as the "lateral" force and the other of which may be referred to as the "medial" force depending upon which foot of the walking subject is in contact with the force plate 22. For the purpose of this invention, lateral force is a transverse force exerted on the force plate 22 in a direction away from the center of the body of the walking subject, whereas, the medial force is the transverse force exerted on the force plate 22 in a direction toward the center of the body of the walking subject.

It will be understood that a piezoelectric type load cell may be adapted to produce either a positive or a negative charge when subjected to compression forces and the opposite charge when subjected to tensile forces (or when an existent amount of compressive force is decreased). However, the charge output developed by a piezoelectric crystal is quite small and must be amplified in order to be utilized by electronic equipment 37 for recording, displaying or analyzing such output. Thus, in FIG. 3, the output of the load cells of assemblies 25, 26 and 27 are each applied to a different one of a plurality of appropriate charge amplifiers which are shown schematically and identified by the reference numeral 36. The output of such charge amplifiers may be used to drive appropriate recording equipment for recording the dynamically changing output of the load cells of assemblies 25, 26, and 27 for subsequent comparison to each other. Similarly, the output of such charge amplifier 36 may be used to drive an appropriate oscilloscope, oscillograph or digital meter for providing a visual representation of the changing outputs of the load cells of assemblies 25, 26, and 27. Such visual representation may be photographed by means of the motion picture cameras 12 and 13, as described above, or preserved by other recording means. Finally, the outputs of the charge amplifiers 36 may be applied to an appropriate computer and/or plotter programmed to compare the changing outputs of the load cells of assemblies 25, 26, and 27 to each other in order to obtain information with respect to torque forces exerted on the force plate 22 by the foot of the walking subject and the various moments of the forces exerted on the force plate 22 by the foot of the walking subject.

Thus, the arcuate arrow 35 shown in FIG. 3 represents the torque exerted on the force plate 22 by the foot of the walking subject in the plane of the walkpath. The arrow 35 is double headed to indicate that such torque may have either sense and it will, of course, vary during the period of time when the foot of the walking subject is in contact with the force plate 22. The torque force 35 is calculated by comparing the outputs of the pair of longitudinal load cell assemblies 26 to each other and to the output of the transverse load cell assembly 27. Such computation may conveniently be performed by an appropriately programmed computer and the variations therein with time may be plotted by the computer or other wise recorded and/or displayed with respect to time.

Referring to FIG. 4 a perspective view of a force plate assembly 20 in accordance with the teaching of this invention, with portions broken away to show structural details thereof is shown. As shown in FIG. 4, the force plate itself 22 is transparent and is provided with a grid of opaque lines and appropriate indicia to aid in computing the area and location of the contact between the foot of the walking subject and the force plate 22 by means of the photographs taken by the camera 21. The flange member 23 is made of metal and is shown broken away in FIG. 4 to show the support structure 24 mounted on the underside thereof. Such support structure comprises a metal framework surrounding the edges of the force plate 22 and comprising a pair of end members 41 and a pair of side members 42, only one of each of which is shown in FIG. 4. A pair of longitudinal members 43 (only one of which is shown in FIG. 4), extend longitudinally of the walk-path and are mounted on the pair of end members 41 adjacent the side members 42 and underneath the force plate 22.

The vertical load cell assemblies 25 are mounted on the longitudinal members 43 adjacent opposite ends thereof and support the four corners of the force plate 22 above such members. The longitudinal load cell assemblies 26 are mounted on the forward one of the pair of end members 41 adjacent the ends thereof and the pair of longitudinal compression spring assemblies 28 are mounted on the rearward one of the pair of end members 41 opposite the load cell assemblies 26. It will be understood that the longitudinal load cell assemblies 26 and the longitudinal compression spring assemblies 27 are in compressive contact with the forward edge and the rearward edge of the force plate 22, respectively.

Similarly, the transverse load cell assembly 27 is mounted on one of the pair of side members 42 and the transverse compression spring assembly 29 is mounted on the other one of the pair of side members 42 in such a way that they compressively contact the opposite side edges of the force plate 22. According to this embodiment of the invention, the transverse load cell 27 and the compression spring assembly 29 are mounted toward the forward end of their respective side members 42.

It would, of course, be possible to use two transverse load cell assemblies 27 and two transverse compression spring assemblies 29 adjacent the ends of side members 42 with but one longitudinal load cell assembly 26 and one longitudinal compression spring assembly 28 on the end members 41. However, the longitudinal forces tend to be greater than the transverse forces and for this reason the embodiment shown is preferred. Obviously, additional longitudinal and transverse load cell assemblies and compression spring assemblies could be used, but it is believed that any additional data that might be obtained thereby would not be worth the additional cost of such assemblies.

Thus, it will be seen that the force plate 22 is operatively supported within the support structure by means of the load cells 25, 26 and 27 and the compression spring assemblies 28 and 29. As shown in FIG. 4 the end 41, side 42, and longitudinal 43 members of the support structure 24 are tubular since such structure provides a convenient means for both mounting and protecting the load cell assemblies 25, 26 and 27 and the compression spring assemblies 28 and 29. However, it will be understood that the support structure 24 may be constructed in other ways and of other materials which provide appropriate surfaces for the mounting of such load cell assemblies and compression spring assemblies to operatively support the force plate 22.

Referring to FIG. 5 an exploded view of a vertical load cell assembly is shown. Similarly, in FIG. 6 an exploded view of a longitudinal load cell assembly 26 is shown. It will be understood that the transverse load cell assembly 27 is identical to the longitudinal load cell assemblies 26, and it will be seen that the longitudinal load cell assemblies 26 differ from the vertical load cell assemblies 25 only in that different load cells 50 and 60 are required by differences in the forces to which they are exposed.

Thus, all of the load assemblies include an anchor stud 44 adapted to engage a threaded passageway provided in the force plate 22 at the points where forces are to be measured. Similarly, all of the load cell assemblies include a hollow cup-like mounting stud 45 and an elongated swivel 46. As most clearly indicated in FIG. 6 one end of the elongated swivel member 46 extends into the cup-like stud 45 and is provided with a ball and socket mount 47 which is adapted to be mounted on the bottom of the cup-like stud 45. As shown in FIG. 5, the free end of the swivel 46 is provided with a threaded hole and as most clearly shown in FIG. 6, the head of the anchor stud 44 is provided with a socket-like concavity.

Thus, in FIG. 5 the vertical load cell 50 is mounted between the swivel 46 and the anchor stud 44 by means of a vertical load cell pivot 51 and a vertical load cell adaptor 52. It will be seen that the vertical load cell pivot is provided with a point-like protrusion adapted to engage the pivot socket in the head of the anchor stud 44 of the assembly 25. The vertical load cell adaptor 52 is provided with a stud adapted to engage the threaded hole in the end of the swivel 46 of the assembly 25.

Referring to FIG. 6 the longitudinal load cell 60 of the assembly 26 is mounted between a force link pivot member 61 and a force link adaptor 62. The force link pivot member is provided with a pivot point adapted to engage the pivot socket in the anchor stud 44 of the assembly 26 and the force link adaptor is provided with a stud adapted to engage the threaded hole in the free end of the swivel 46 of the assembly 26.

The purpose of mounting the vertical load cell 50 and longitudinal load cell 60 between a swivel means and a pivot means as described is to avoid the imposition of torque forces on the respective load cells. As is well known, a piezoelectric load cell comprises a crystal, usually quartz, which is carefully cut along a particular axis thereof and mounted in the cell to measure forces exerted along the axis of the cell. Thus, torque forces and forces exerted other than along the axis of the cell will tend to produce erroneous outputs and may damage the crystal. It will be seen that the swivel 46 and pivot means included in the assemblies 25 and 26 will insure that all forces on the load cells thereof will be exerted along the axes of such load cells.

As shown in both FIGS. 5 and 6 the load cells 50 and 60 are provided with an appropriate means for making electric connections thereto represented generally at 55. By comparing FIGS. 5 and 6, it will be seen that the load cell assembly 26 differs from the load assembly 25 in that the force link pivot member 61 and force link adaptor 62 are specifically designed to accommodate the load cell 60 whereas the pivot member 51 and adaptor 52 of the vertical load cell assembly 25 are specifically adapted to accommodate load cell 50.

Referring to FIG. 7, an exploded view of a compression spring assembly 28 is shown Compression spring assemblies 28 and 29 are identical in structure and each includes a compression spring 70 mounted about a compression bolt 71 having a spring retrainer head 72 at one end thereof and being threaded on the other end thereof to receive jam nuts 73 and 74. The compression bolt 71 passes through a hollow mounting stud 75 similar to mounting studs 45 with the compression spring 70 held between the retainer 72 and the mounting stud 75 in a partially compressed condition established by the jam nuts 73.

The compression spring assembly 28 includes an anchor stud 74 adapted to be received in a threaded passageway in the plate 22. An elongated swivel member 76 is mounted by one of its ends on the head of the anchor stud 74 by a ball and socket type mounting. A pivot member 78 is provided between the free end of the swivel member 76 and the retainer member 72. As shown in FIG. 7, the free end of the pivot member 78 is provided with a point-like protrusion and the retainer member 72 is provided with a socket-like concavity. The end of the pivot member 78 adjacent the swivel member 76 is provided with a stud and the free end of the swivel member 76 is provided with a threaded hole to receive the stud. Thus, the compression spring assembly 28 is provided with a swivel means and a pivot means spaced from each other to enable it to cooperate with the longitudinal and transverse load cell assemblies 26 and 27 in avoiding the application of other than axial forces to the load cells of such assemblies.

FIG. 9 is a schematic representation of the body movements of a walking subject during the interval of time when the force plate according to the teaching of this invention is operative. As shown in FIG. 9, it is the left foot of the walking subject which contacts the force plate 22 rather than the right foot of the walking subject as shown in FIG. 1. Thus, the interval of time begins when the heel of the left foot of the walking subject strikes the force plate 22. Although a full cycle in the gait of the walking subject is not completed until the heel of the left foot again strikes the pathway, it will be seen the interval of time during which the force plate is active ends with the removal of the left foot from the force plate 22. As shown in FIG. 9, a number of well defined reference points may be identified during the time interval when the left foot is in contact with the force plate 22. Thus, beginning with the heel strike of the left foot on the force plate, the next succeeding reference point will be when the full contact area of the left foot engages the force plate 22, which reference point is identified in FIG. 9 by the words "foot flat." The next succeeding reference point occurs when the right foot is lifted from the walkpath as indicated by the figure associated with the words "opp. toe-off." The full weight of the walking subject is then imposed on the force plate with varying distribution over the contact area of the foot until the next reference point when the heel of the left foot is lifted from the force plate 22 as indicated by the figure associated with the words "heel-off." The area of the engagement between the foot and the force plate 22 then decreases while continuing to bear the full weight of the walking subject until the right heel strikes the walkpath as indicated by the figure associated with the words "opp. heel strike." Finally, the interval of time during which the force plate is operative terminates when the left foot is lifted from the force plate as indicated by the figure associated with the words "toe-off." Thus, it will be seen from FIG. 9 that the force plate is operative during approximately 63 percent of a full cycle in the gait of a walking subject. For complete analysis of the gait of a walking subject, it is necessary to repeat the above cycle but with the right foot in engagement with the force plate, instead of the left foot.

It will be obvious from a study of FIG. 9 that the forces exerted by the left foot of the walking subject on the force plate will undergo rapid and dramatic changes during the time when the foot of the walking subject is in contact with the force plate. For example, the longitudinal forces exerted on the force plate at "heel strike" of the left foot will tend to be exerted in the forward direction with respect to the walking subject decreasing through the "foot flat" position and tending to pass through O at the "opp. toe-off" position. By the time the "heel-off" position is reached, the longitudinal forces exerted on the force plate by the left foot will tend to be in the aft direction with respect to the walking subject and will increase in the aft direction through the "opp. heel strike" position tending to reach a maximum at the "toe-off" position.

During the same interval of time, the transverse forces exerted on the force plate 22 by the left foot of the walking subject will change in their intensity and vary between lateral and medial at various points in the stride depending upon the peculiar gait of the walking subject. According to the teaching of this invention, the vertical, longitudinal and transverse load cells are all specifically adapted to sense only pure vertical, longitudinal and transverse forces due to the swivel and pivot means provided in such load cells as discussed hereinabove. However, the torque exerted on the force plate by the foot of the walking subject and the moments of the vertical and horizontal forces exerted on such force plate are also of extreme importance in analyzing the gait of the walking subject.

According to the teaching of this invention, such torque and moments are computed by comparing the outputs of the various load cells to each other with respect to time. However, such computations are subject to interpretation and it is often difficult to accurately correlate the torque and moment computations with respect to each other. This is particularly true since the force plate 22 must be large enought to enable it to be contacted by the foot of the walking subject without imposing an artificial limitation on the free exercise of normal gait by the walking subject. Thus, as shown in FIG. 1 the contact area of the foot of the walking subject is small in comparison to the area of the force plate 22 and contact between the foot of the walking subject and the force plate 22 will therefore tend to be localized at random positions on the force plate 22 during successive analysis of the stride of a particular subject or of different subjects.

According to the teaching of this invention, the photographs of the foot of the walking subject in contact with the force plate 22 taken by the camera 21 located in the pit beneath the force plate 22 may be used to insure accurate interpretation of computations based on the output of the load cells. Thus, as shown in FIG. 10, particular frames of the motion picture taken by the camera 21 may be geometrically analyzed and the results of such geometric analysis correlated in time with the computations based on the outputs of the load cells. The opaque indicia on the force plate 22 will, of course, help in determining the exact location on the force plate 22 of the contact area of the foot of the walking subject as well as in computing such contact area itself. Similarly, the change in such contact area from frame to frame of the motion picture may be computed.

The device shown in FIG. 10 does not constitute any part of the subject invention. Instead, as shown in FIG. 11 such device may be the same as that heretofore used to analyze angular variations in the members of the walking subject from successive frames of a motion picture taken of such subject. It will be understood that the device shown in FIGS. 10 and 11 is capable of optically enlarging the image appearing in the frame of the motion picture and also of optically orienting such figure for presentation to the viewer, as desired. The controls labeled X and Y on the device of FIGS. 10 and 11 may be used to adjust X and Y verniers, as indicated, to aid the viewer in analyzing areas and angular relationships.

From the above description of the method and means of this invention, it will be understood that this invention provides for the full analysis of the gait of a walking subject. The force plate assembly according to the teaching of this invention is extremely sensitive as represented by the fact that the heartbeat of a subject may be detected when the subject is standing motionless upon the force plate. The motion pictures taken by the camera 21 of the foot of the walking subject in contact with such force plate assembly enable accurate interpretation of the electronic output of the force plate assembly. Correlation of the output of the force plate assembly with an analysis of the angular relationship of the members of the walking subject from the motion pictures taken by the cameras 12 and 13, as well as with electromyographic data obtained as described above, enable full analysis of all aspects of the gait of the walking subject. Experiments conducted to date indicate that not only is it possible to detect abnormalities in such gait and to analyze the effectiveness of corrective measures therefor, but also that the differences between the gaits of walking subjects may be such that such differences could be used for identification purposes in the way that fingerprints, voice prints and dental work have been used heretofore. In other words, results to date indicate that the method and means of this invention may be sufficiently sensitive to distinguish between the gait of one individual and the gait of another individual even though both individuals may be considered to have a normal gait.

The method and means of this invention provides a valuable diagnostic tool for use in detecting and correcting abnormalities in gait and may find broader application. The specific structure of the force plate assembly and of the load cell assemblies included therein include a number of novel features. It will be understood that various structural embodiments differing from the disclosed and claimed herein but including such novel features may be obvious to those skilled in the art. Thus, it is believed that the method and means of this invention will be modified by those skilled in the art to adapt it for various uses and applications. It is of course contemplated that various combinations of electronic equipment for recording and processing the electromyographic and force data and various methods of analyzing such data may be used in accordance with the teaching of this invention.

In an embodiment of the force plate assembly 20, actually constructed and tested in accordance with the teaching of this invention, the load cells used in the vertical load cell assemblies 25 and the longitudinal 26 and transverse 27 load cell assemblies were quartz crystal devices sold by Kistler Instrument Company and designated Model 912 and Model 932A, respectively. Similarly, the charge amplifiers 36 used with such load cells were of the type sold by Kistler Instrument Company and designated Model 504A. In such embodiment, the force plate 22 was a 24 inch square by 1¾ inch thick transparent plexiglas plate and the support assembly 24 was made of two inch square steel tubing.

What is claimed is:

1. In the method of analyzing the gait of a subject walking a prescribed path by sensing the forces applied to a discrete area of said path by a foot of said walking subject, the steps of:
   a. converting the varying vertical load forces imposed by said foot of said walking subject on said discrete area of said path during a given interval of time to correspondingly varying electrical signals;
   b. converting the varying shear forces imposed by said foot of said walking subject on said discrete area longitudinally of said path during said given interval of time to correspondingly varying electrical signals;
   c. converting the varying shear forces imposed by said foot of said walking subject on said discrete area laterally of said path during said given interval of time to correspondingly varying electrical signals;
   d. recording all of said varying electrical signals with respect to time;
   e. comparing the values of said recorded electrical signals at various instants of said given interval of time to each other;
   f. photographing said walking subject at successive instants of said given interval of time in the plane of said prescribed path; and
   g. correlating said photographs with said recorded electrical signals with respect to time.

2. In the method of claim 1, the additional steps of photographing said walking subject at successive instants of said given interval of time in planes which are lateral and longitudinal, respectively, of said prescribed path and correlating said photographs with said recorded electrical signals, with respect to time.

3. In the method of claim 1, the additional steps of obtaining data with respect to muscle activities of the lower extremities of said walking subject at successive instants of said given interval of time by electromyography and correlating said data with said recorded electrical signals with respect to time.

4. The method of claim 1, wherein said discrete area of said prescribed path is transparent and said step of photographing said walking subject in the plane of said path is performed from a point vertically below said discrete area of said path.

5. The method of claim 1 wherein said step of converting the varying vertical load forces imposed on said discrete area of said path to correspondingly varying electrical signals is performed simultaneously at three spaced points of said discrete area and the resulting signals are processed to provide information as to variations in the moment of said vertical forces with time.

6. The method of claim 1 wherein said step of converting the varying shear forces imposed on said discrete area of said path to correspondingly varying electrical signals is performed simultaneously at two spaced points on the periphery of said discrete area and the resulting signals are processed to provide information as to variations in the moment of said shear forces with time and variations with time of the torque resulting from said shear forces in the plane of said prescribed path.

7. The method of claim 5 wherein said steps of converting the varying shear forces imposed on said discrete area longitudinally and laterally of said path to correspondingly varying electrical signals is performed at three spaced points on the periphery of said discrete area and the resulting signals are processed to provide information as to variations with time of the moment of said shear forces and the torque resulting from said shear forces in the plane of said prescribed path.

8. The method of claim 7 including the steps of photographing said walking subject at successive instants of said given interval of time in the plane of said prescribed path and in planes which are longitudinal and lateral of said prescribed path; obtaining data with respect to muscle activities of the lower extremities of said walking subject at successive instants of said given interval of time by electromyography; and correlating in time said photographs and said data with said recorded electrical signals and said information as to variations with time of the moments of said forces and torque resulting therefrom.

9. The method of claim 4 wherein said step of correlating said photographs taken from a point vertically below said discrete area of said path with said recorded electrical signals with respect to time includes the geometric analysis of the area of contact between said foot of said walking subject and said discrete area of said path.

10. Apparatus for use in analyzing the gait of a subject walking a prescribed path by sensing the forces applied to a discrete area of said path by a foot of said walking subject comprising:
 a. a force plate of sufficient thickness to be rigid when subjected to the full weight of said walking subject, said plate having parallel opposed major surfaces of substantially larger area than the contact area of said foot of said walking subject and a peripheral edge normal to said major surfaces;
 b. means mounting said plate with one of said major surfaces thereof forming said discrete area of said prescribed path, said means including a plurality of piezoelectric load cell assemblies and a plurality of compression spring assemblies in operative contact with said plate, a first one of said plurality of load cell assemblies and a first one of said plurality of compression spring assemblies contacting said edge of said plate on opposite sides of said plate at points lying on a first line, a second one of said plurality of load cell assemblies and a second one of said plurality of compression spring assemblies contacting said edge of said plate on opposite sides of said plate at points lying on a second line transverse to said first line, and a third one of said plurality of load cell assemblies contacting the other one of said major surfaces of said plate; and
 c. means for recording the electrical output of said plurality of piezoelectric load cell assemblies with respect to time.

11. Apparatus as claimed in claim 10 wherein each of said plurality of load cell assemblies includes a load cell mounted between a pair of pivot means and an elongated swivel means in contact with one of said pivot means.

12. Apparatus as claimed in claim 11 wherein each of said plurality of compression spring assemblies includes a pair of spaced pivot means and an elongated swivel means in contact with one of said pivot means.

13. Apparatus as claimed in claim 10 wherein said means mounting said plate with one of said major surfaces thereof forming said discrete area of said path comprises a pit in said path and a frame mounted in said pit and supporting said plurality of piezoelectric load cell assemblies and said plurality of compression spring assemblies for operative contact with said plate whereby said plate is positioned for use with said one major surface thereof flush with said prescribed path.

14. Apparatus as claimed in claim 13 wherein a fourth one and a fifth one of said plurality of piezoelectric load cell assemblies are supported by said frame in operative contact with said other one of said major surfaces of said plate at points spaced from the point of contact therewith by said third one of said plurality of load cell assemblies.

15. Apparatus as claimed in claim 13 wherein said edge of said plate includes a first rectilinear portion extending in a direction substantially perpendicular to the longitudinal axis of said path, said first one of said plurality of piezoelectric load cell assemblies being supported by said frame in operative contact with said first rectilinear portion of said edge and a sixth one of said plurality of piezoelectric load cell assemblies supported by said frame in operative contact with said first rectilinear portion of said edge at a point spaced from said first one of said plurality of load cell assemblies.

16. Apparatus as claimed in claim 15 wherein said second line including said points of contact between said edge of said plate and said second one of said plurality of load cell assemblies and said second one of said plurality of compression spring assemblies is substantially perpendicular to said longitudinal axis of said path.

17. Apparatus as claimed in claim 15 wherein said edge of said plate includes a second rectilinear portion on the opposite side of said plate from said first rectilinear portion and substantially parallel thereto, said first one of said plurality of compression spring assemblies is supported by said frame in operative contact with said second rectilinear portion at a point such that said first line is substantially parallel to the longitudinal axis of said path and a third one of said plurality of compression spring assemblies is supported by said frame in operative contact with said second rectilinear portion at a point spaced from said first compression spring assembly, said points of contact of said third one of said plurality of compression spring assemblies and said sixth one of said plurality of load cell assemblies lying on a third line spaced from and substantially parallel to said first line.

18. Apparatus as claimed in claim 13 wherein said plate is made of transparent material and a camera is mounted in said pit and oriented to photograph the foot of said walking subject in contact with said one major surface of said plate.

19. Apparatus as claimed in claim 10 wherein said means for recording said electrical output of said piezoelectric load cell assemblies with respect to time includes means for the visual display thereof.

20. Apparatus as claimed in claim 10 wherein said means for recording said electrical output of said piezoelectric load cell assemblies with respect to time includes means for processing said signals with respect to each other.

21. Apparatus as claimed in claim 10 wherein camera means are included for photographing said walking subject at said discrete area of said path in the plane of said path and in planes extending longitudinally and laterally, respectively, of said path.

22. Apparatus as claimed in claim 10 including electromyography means for obtaining data in the form of electrical signals with respect to muscle activities in the lower extremities of the walking subject and recording means for recording said data with respect to time.

* * * * *